United States Patent
Solomonides

(10) Patent No.: US 11,046,833 B2
(45) Date of Patent: Jun. 29, 2021

(54) BIODEGRADABLE BIOPLASTIC COMPOSITIONS AND METHOD OF MAKING AND USING THE SAME

(71) Applicant: Evan Gash Solomonides, Boylston, MA (US)

(72) Inventor: Evan Gash Solomonides, Boylston, MA (US)

(*) Notice: Subject to any disclaimer, the term of this patent is extended or adjusted under 35 U.S.C. 154(b) by 163 days.

(21) Appl. No.: 15/979,070

(22) Filed: May 14, 2018

(65) Prior Publication Data

US 2018/0282509 A1    Oct. 4, 2018

Related U.S. Application Data

(63) Continuation of application No. 15/118,207, filed as application No. PCT/US2016/018380 on Feb. 18, 2016, now abandoned.

(Continued)

(51) Int. Cl.
C08K 5/053     (2006.01)
C08K 5/09      (2006.01)
(Continued)

(52) U.S. Cl.
CPC ............ *C08K 5/053* (2013.01); *C08J 3/2053* (2013.01); *C08K 5/09* (2013.01); *C08L 3/02* (2013.01);
(Continued)

(58) Field of Classification Search
None
See application file for complete search history.

(56) References Cited

U.S. PATENT DOCUMENTS 5,280,055 A * 1/1994 Tomka ............... C08L 1/10
                                                    524/35
5,288,318 A * 2/1994 Mayer ............... C08L 1/12
                                                    106/126.3
(Continued)

FOREIGN PATENT DOCUMENTS

CN    102993465 A    3/2013
CN    102993466 A    3/2013
(Continued)

OTHER PUBLICATIONS

Thermoplastic Starch—Potato Plastic; http://jlocklin.uga.edu/images/outreach/potatoplasticlabmodule.pdf; Date Unknown.*
(Continued)

*Primary Examiner* — Colin W. Slifka
(74) *Attorney, Agent, or Firm* — Dentons US LLP

(57) ABSTRACT

Bioplastic compositions containing between 2 wt. % and 25 wt. % of at least one starch, between 40 wt. % and 65 wt. % of at least one plasticizer, and between 1 wt. % to 10 wt. % of at least one acid are used as insulation materials. A method of making a bioplastic composition includes the steps of heating a first aqueous mixture containing at least one plasticizer and at least one acid; adding at least one starch to the first aqueous mixture to produce a second aqueous mixture; heating and mixing the second aqueous mixture to produce a precipitate; and separating the precipitate from residual liquid of the second aqueous mixture to produce a bioplastic composition.

9 Claims, 9 Drawing Sheets

Related U.S. Application Data

(60) Provisional application No. 62/117,568, filed on Feb. 18, 2015.

(51) Int. Cl.
  *C08L 3/02* (2006.01)
  *C08J 3/205* (2006.01)
  *E04B 1/76* (2006.01)
  *E04B 1/78* (2006.01)

(52) U.S. Cl.
  CPC .................. *E04B 1/76* (2013.01); *E04B 1/78* (2013.01); *C08J 2303/02* (2013.01); *C08K 2201/018* (2013.01)

(56) References Cited

U.S. PATENT DOCUMENTS

| | | | |
|---|---|---|---|
| 5,512,378 A * | 4/1996 | Bastioli | C08J 7/04 428/484.1 |
| 5,523,293 A | 6/1996 | Jane et al. | |
| 5,893,248 A | 4/1999 | Beliveau | |
| 6,231,970 B1 * | 5/2001 | Andersen | C08L 3/02 106/145.1 |
| 9,085,677 B2 * | 7/2015 | Budina | C08L 97/02 |
| 2009/0110942 A1 * | 4/2009 | Henderson-Rutgers | B32B 1/02 428/483 |
| 2009/0312462 A1 * | 12/2009 | Oakley | C08L 3/02 524/47 |
| 2012/0309246 A1 | 12/2012 | Tseitlin et al. | |

FOREIGN PATENT DOCUMENTS

| | | |
|---|---|---|
| JP | H07278351 A | 10/1995 |
| JP | 2002532600 A | 10/2002 |
| JP | 20060137847 A | 6/2006 |
| JP | 2008516016 A | 5/2008 |
| JP | 2008517108 A | 5/2008 |
| JP | 2009533538 A | 9/2009 |
| JP | 2009545658 A | 12/2009 |
| WO | WO2006042364 * | 4/2006 |
| WO | WO2007118280 * | 10/2007 |

OTHER PUBLICATIONS

International Search Report issued in International Application No. PCT/US2016/018380, dated Apr. 5, 2016.
Written Opinion of the International Searching Authority issued in International Application No. PCT/US2016/018380, dated Apr. 5, 2016.

* cited by examiner

BIODEGRADABLE BIOPLASTIC COMPOSITIONS AND METHOD OF MAKING AND USING THE SAME

CROSS-REFERENCE TO RELATED APPLICATIONS

The application a continuation of U.S. application Ser. No. 15/118,207, filed Aug. 11, 2016, which is a National Stage Entry of International Application No. PCT/US2016/018380, filed on Feb. 18, 2016, that claims the benefit of and priority to U.S. 62/117,568, filed Feb. 18, 2015, which are hereby incorporated by referenced into this application in their entirety.

TECHNICAL FIELD

The present disclosure relates to bioplastic compositions containing starch, methods of making these compositions, and methods of using these compositions as insulators and more particularly to bioplastic compositions containing a starch, a plasticizer, and an acid and the use of these compositions as insulation.

BACKGROUND

With housing expanding rapidly in the developing world, there is a growing need for a sustainable source of insulation. Many nations with new or quickly growing housing sectors have extreme climates, and therefore a need for an effective insulator which can maintain a large temperature difference between the interior and exterior of a residence. Modern forms of insulation rely on petroleum-based polymers, which are potentially harmful to the environment when they are disposed of, and remain in ecosystems for centuries because of their long lifespans and non-biodegradability. To satisfy the demand for insulation and mitigate the negative effects of toxic polymers, bioplastics can be produced and processed to have the desired properties for an insulator.

Recent reconsideration of the environmental impact of existing insulation has led to a reevaluation of its merits. The polymers used, most commonly synthesized, inorganic plastics are potentially devastating to an ecosystem if they were to be disposed of improperly. These plastics are nearly inert to decomposition and can continue to pollute and damage the environment for decades, if not centuries. In the rare occurrence that these polymers are correctly disposed of, they release methane, carbon dioxide, and other harmful greenhouse gases. Many brands of insulation rely on polymerized petroleum products, commonly in the form of polystyrene. These polymers are formed of repeating chains of identical constituent parts bonded together into strands of varying length. While they are being formed, they become entangled, forming an amorphous solid which can then be injected with gases to produce bubbles of high thermal resistance. This process is used to produce many of the most common commercial insulations. These polymers are processed to meet the criteria of an efficient insulator, namely that they are flexible; can retain their shape and strength at thicknesses of under two inches; can be bonded to other materials using industrial adhesives; are resistant to flame, weather erosion, and decay or consumption by microbes and insects; and have a very low thermal conductivity.

Two of the most common methods for producing insulation from these harmful plastics are spinning and foaming. In the spinning process, the plastics are melted down and spun into fibers using a heated, rapidly rotating extruder apparatus. These fibers are then woven together very loosely, in order to trap large amounts of gas within the material, increasing the insulating efficiency. In the foaming process, the plastic is melted and extruded through a device which injects high concentrations of thermally resistive gas into the molten polymer. Both of these methods have the negative consequence of requiring large amounts of thermal and mechanical energy, which further increases the environmental cost of these insulations.

BRIEF SUMMARY

Disclosed herein are compositions and methods addressing the shortcomings of the art, and may provide any number of additional or alternative advantages. Described herein are bioplastic compositions containing starch, methods of making these compositions, and methods of using these compositions as insulators and more particularly to bioplastic compositions containing a starch, a plasticizer, and an acid and the use of these compositions as insulating materials for buildings.

Certain embodiments include a bioplastic composition containing at least one starch, at least one plasticizer, and at least one acid. The at least one starch is present between 2 wt. % and 25 wt. %; the at least one plasticizer is present between 40 wt. % and 65 wt. %; and the at least one acid is present between 1 wt. % to 10 wt. %. The starch can be selected from the group consisting of corn starch, cassava starch, arrowroot starch, potato starch, taro starch, sweet potato starch, tannia starch, and combinations thereof. In certain embodiments, the plasticizer is glycerin. In certain embodiments, the acid is acetic acid. Certain embodiments include a bioplastic composition containing at least one starch between 5 wt. % and 15 wt. %, at least one plasticizer between 45 wt. % and 55 wt. %, and the at least one acid between 1 wt. % to 5 wt. %. In certain embodiments, the bioplastic compositions have a thermal conductivity of the bioplastic composition is from 0.05 to 0.25 W/(m° C.). Certain embodiments include a bioplastic composition containing at least one starch, at least one plasticizer, and at least one acid, where ratio of the least one starch to at least one plasticizer to at least one acid is a weight ratio of about 10:2:2 to about 10:4:4. The ratio of the at least one starch to the at least one plasticizer to the at least one acid can be a weight ratio of about 10:3:3.

Certain embodiments include a method of making a bioplastic composition. The method includes the steps of heating a first aqueous mixture containing at least one plasticizer and at least one acid; adding at least one starch to the first aqueous mixture to produce a second aqueous mixture; heating and mixing the second aqueous mixture to produce a precipitate; and separating the precipitate from residual liquid of the second aqueous mixture to produce a bioplastic composition. The bioplastic composition contains between 2 wt. % and 25 wt. % of at least one starch, between 40 wt. % and 65 wt. % of at least one plasticizer, and between 1 wt. % to 10 wt. % of at least one acid. The method of making these bioplastic compositions can further include heating the first aqueous mixture to a temperature from 80° C. to about 120° C.

Certain embodiments of the invention include a method of insulating a building using the bioplastic compositions described herein. The method includes placing an insulation structure made of a bioplastic composition between a ceiling and a roof of a building, where the bioplastic composition contains between 2 wt. % and 25 wt. % of at least one starch, between 40 wt. % and 65 wt. % of at least one plasticizer, and between 1 wt. % to 10 wt. % of at least one acid Numerous other aspects, features and benefits of the present disclosure may be made apparent from the following detailed description taken together with the drawing figures. The compositions can include bioplastic materials described herein, other components, or additives to modify the physical properties of the materials depending on desired use of the bioplastics. It should be further understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
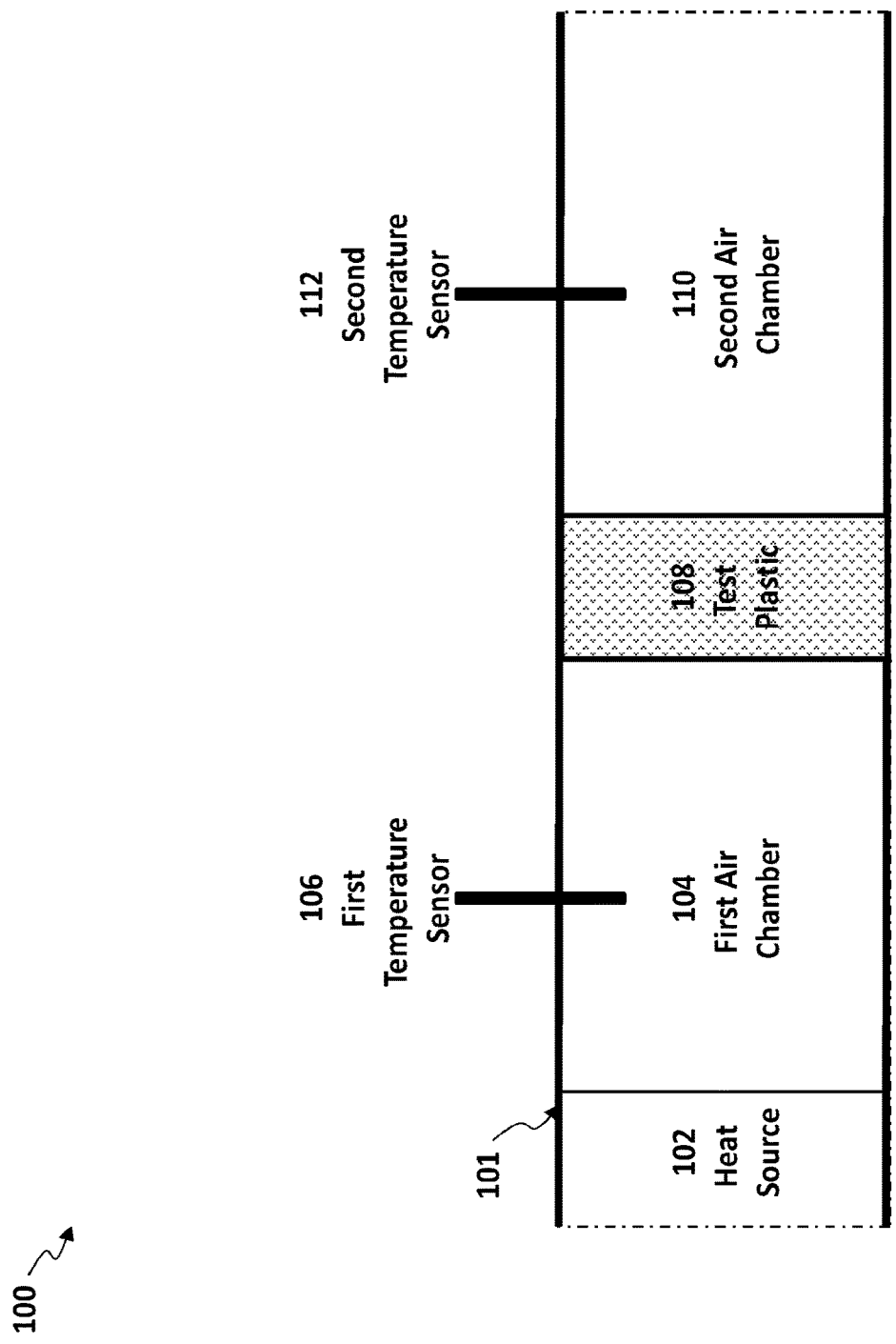
FIG. 1 is an illustration of a particular apparatus constructed to analyze insulation properties of bioplastic compositions, according to an exemplary embodiment of the invention.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

The rapidly expanding housing sector in the developing world has produced a large demand for insulation. Most modern forms of insulation are environmentally harmful and difficult to produce without sophisticated machinery. A sustainable bioplastic was engineered to provide an alternative for insulation without the negative environmental effects or production complexity of petroleum-based products. Bioplastics are chains of naturally occurring monomers bonded together via a polymerization reaction that offer a non-toxic, biodegradable alternative to traditional plastics. By using different production methods and different monomer sources including lipids and carbohydrates such as starches, bioplastics can be produced to have a wide range of mechanical, thermal, and chemical properties. These plastics can then be processed using a wide range of methods including molding, drying, and extrusion to give them properties specific to their desired use. With this high variance of attributes, bioplastics can be used to fill almost any niche currently filled by harmful, industrial plastics.

A zero-waste process for producing bioplastics was developed, and used to produce several plastics. Using this process, a polymer was made using amylose and amylopectin from potato starch (*Solanum tuberosum*), glycerin, and acetic acid. The plastic was tested for durability and susceptibility to potential microbial degradation. Forms of this plastic with different concentrations of the components were tested for thermal resistivity, and the ratio of components were varied to study the effective insulation materials. The resulting polymer has properties that make it viable for commercial use in consumer products. Moreover, the low cost of materials and relative ease of production make it ideal for deployment in the developing world as insulation for walls and corrugated metal roofing.

Yucca cassava (*Manihot esculenta*) was also used as the monomer source; this indicates that a variety of tropical starchy tubers will function as well as potatoes. Pure corn starch was performed similar to the bioplastic made from potato, indicating new uses for the large surplus of corn in the American agricultural industry.

A bioplastic suitable for use as insulation in the developing world must use monomers which are plentiful and inexpensive, and have a very high thermal resistivity. Potato starch is one of the ideal materials for this role because it is abundant, easily grown in nearly any climate, and is similar in chemical composition to starchy plants native to tropical regions. The resulting plastic can then be processed to achieve the ideal traits of an insulator.

Biomaterials, the sources of monomers for bioplastic production, can come from a variety of unrelated sources from every kingdom of life. Bioplastics are polymer chains produced from any organically-derived monomer. These materials mimic the properties of petroleum-derived plastics, but are produced, in part or in full, through the metabolic pathways of the source organism. Most of the produced macromolecules are biodegradable, which makes them useful for green technologies.

The cost in energy currently required in plastic production can be minimized if biological processes are used to do the majority of the work, such as the construction of the monomers. Energy is then expended efficiently as heat to bond the monomers into longer chains. Bioplastics avoid the disposal cost of traditional plastics, because they can be made to biodegrade in the presence of certain enzymes, or after a specified amount of time. An additional benefit to using biological processes is that, instead of releasing $CO_2$ during the production process, it is trapped in the material itself and not released until decomposition, detracting from the total quantity of $CO_2$ in the atmosphere at any given time.

Bioplastic compositions described herein can have a wide range of physical properties that are determined by composition and production method. Bioplastic compositions described herein consistently tested with extremely low thermal conductivities, which makes them ideal for insulation. They can also easily be made to be flexible, of varying thicknesses, and resistant to chemical erosion. The property of an ideal insulator that challenges bioplastics is resistance to flame, because the largely hydrogen, carbon, and oxygen structures of these materials lend themselves to relatively easy combustion. Though bioplastics already perform better than most petroleum-derived plastics in terms of thermal resistivity, their flame resistance properties can be more effectively structured by using different biological processes to produce the plastics.

Starches are commonly found as small spherical or oblong granules. They comprise interlocking and repeating chains of amylose (20-30%) and amylopectin (70-80%). Amylose is formed of single, unbranched chains of repeating glucose molecules and contains approximately 1000 constituent molecules. Amylopectin has a varied, branching structure, also composed of glucose molecules, and can contain up to 60 component parts.

Agricultural starches such as potatoes present a particularly promising option for a source of monomers. Potatoes are being engineered with higher concentrations of starches and with less cellulose. Cellulose has to be extracted in order to obtain the pure starch. Due to the extremely high starch content of potatoes (approximately 85% of dry mass), even ordinary garden varieties have a potential for use in manufacturing. Potato starch is currently considered a waste product of potato processing plants. This waste product can be processed into a resin, which can be heated and shaped into a variety of products through an injection molding process. By developing new strains of potatoes and new production methods, the uses of these plastics can be made to cover the spectrum of the roles currently filled by traditional plastics. The ability of these plastics to compost and degrade under specific conditions makes them incredibly beneficial to the environment when used as a replacement for petroleum-based plastics.

The formation of plastics can be classified as a polymerization reaction, with the initial material (a monomer source) being reacted with a plasticizer or polymerizing agent and an acid to facilitate the combining of the monomers into larger polymers. The agent bonds monomers and polymers into longer chains, while the acid cross-links these chains. This reaction has the potential to change fundamental properties of the monomer, creating an entirely unique material with a completely different morphology. This process can be further classified as either a step-reaction polymerization or a chain-reaction polymerization.

A step-reaction polymerization, also known as condensation polymerization, is the process by which polymer chains grow through the bonding of two different monomer types. The two different molecules can be bonded end to end indefinitely, so long as a consistent monomer source is present at one end of the macromolecule.

A chain-reaction polymerization, also known as addition polymerization, is the process through which an initiator begins the growth reaction of a polymer. Unlike in a step-reaction, a chain-reaction can occur between identical monomers, which allows for more consistent production. During the reaction the bonding agent, usually a free radical, reacts with the end of one of the monomers. This results in a new, larger free radical comprising both the monomer and the bonding agent, which can then react again with another polymer, and continue doing so indefinitely, building a chain of indeterminate length and uniform composition.

The processing of bioplastics can be classified into three main categories: wet state shaping, rubbery state shaping, and molten state shaping. Each process presents different benefits and can be used to achieve different properties from the same plastic. Wet state shaping is the process by which polymers in solution can be extracted and spun into fibers using wet-spinning, fiber-spinning, spreading, or dipping techniques utilized in the processing of traditional plastics. Because of the complexity and time required for dissolving plastics into solution only to re-solidify them, wet state shaping is challenging for industrial or commercial purposes, though it does offer a level of control over the product which is useful in scientific and nano-engineering applications.

Rubbery state shaping, mainly thermoforming and calendaring, can be done while the plastic is partially solidified. This has the benefit of using materials that are more quickly dried and solidified than molten methods, while remaining easily malleable. Though these methods do offer stability in production, the cost in energy of cooling and then reheating the plastic negates much of the environmental benefit of a bioplastic. This process also has a considerable waiting period during cooling, which detracts from its industrial potential.

Molten state shaping, also known as melt-processing, is identified as treating and shaping the plastic before it solidifies, or after it has been re-melted. The plastic is either injection molded, compression molded, spun into fibers, blown into the desired shape, calendared, or extruded. These methods are essentially the same as those used with existing plastics, and have the benefit of dealing with an easily malleable liquid as opposed to a rigid solid. There is no waste because the liquid plastic can be dispensed as needed. Because of the low energy cost of using already-molten plastics during processing, these methods offer superior environmental benefits to the other methods discussed. There is also no delay between the production and the processing of the plastic, which makes it an attractive route for industrial manufacturing purposes.

The most applicable molten state method for inexpensive manufacturing is the use of extruders. This would have the added benefit of allowing for heat treatment and shaping with one process. The extruder used to fill the desired mold with molten plastic can be heated to ensure a uniform heating of all of the plastic which passes through it.

To increase the thermal resistivity of the plastic, it can be injected with bubbles of highly resistive gas, greatly decreasing its conductivity and increasing its volume, providing both thermal and mechanical benefits. Poor thermal conductors such as carbon dioxide can be injected into the molten resin in either gaseous or supercritical state. Because the extruder must be kept at a high temperature and pressure, it is preferable to use carbon dioxide in a supercritical state. In this state, the gas diffuses quickly and is very dense, which allows for efficient injection into the resin, making this process ideal for industrial production of resin foam. This technique requires very advanced machinery, and thus it is only applicable in technologically sophisticated regions.

Many commercial uses for plastic rely on their ability to be shaped into any form. Insulation, for example, could be used as a liner for insulated containers, coolers, or other temperature-controlled products if produced in the appropriate shape. The most common process by which to do this is molding. The polymer being used is injected, in molten state, into a casting of the desired product. It is then compressed, heated, or cooled, depending on the polymer. A compression molding is the least efficient, because it relies on time to cure the plastic. The other two methods can both be finished in seconds with automated cooling or heating.

There are two main types of plastic, thermoplastic and thermal-set plastic, that determine which molding methods can be used. Thermoplastics are produced at their melting point and either cooled or compressed until they become solid. At any point, being brought back to this production temperature will cause the plastic to melt once more, and allow for it to be recycled and reprocessed. Thermal-set plastics are produced at similar temperatures, but have to be raised to a higher temperature to set completely. They are subsequently cooled and become solid. They are very difficult to melt down again because their new melting points are considerably higher than their production temperatures. Because of this, most thermal-set plastics are non-recyclable and can only be processed once with no margin of error for reshaping or reuse.

In the plastics industry, it is common for engineers to prototype new molds and designs using a manually-poured compression casting. The reactants required to form a thermal-set polymer are poured into the mold, which is then sealed and locked into place with pressure. An exothermic reaction occurs in the solution, producing the polymer and setting it with released heat. The apparatus is allowed to cool, at which point the quality of the casting is inspected. If the mold is deemed acceptable, the process can be repeated with a thermoplastic or used to test new polymers. Once the combination of mold and plastic are found to be of sufficient quality, the prototyping stage is complete, and a steel casting can be made and fit to an industrial mechanism for rapid production. This device relies on high-pressure injection molding and rapid heating/compression via hydraulic arms attached to heated plates to produce a large quantity of the desired product in a short time. This machine can accelerate the manual process to an output level fit for industrial production. These devices are also customizable for each new polymer and mold, making them very versatile and each capable of producing a large variety of different products. In order for a polymer to be commercially viable, it must be able to be processed by one of these machines.

Disclosed herein are bioplastic compositions containing a starch, a plasticizer, and an acid, and methods of making these compositions. The compositions can contain different relative amounts of starch, plasticizer, and acid as required to obtain desired physical properties. The compositions contain at least one starch at a concentration between about 2 wt. % to about 40 wt. %, at least one plasticizer at a concentration between about 30 wt. % to about 65 wt. %, and at least one acid at a concentration between about 1 wt. % to about 10 wt. %. The compositions contain at least one starch at a concentration between about 2 wt. % to about 25 wt. %, at least one plasticizer at a concentration between about 40 wt. % to about 65 wt. %, and at least one acid at a concentration between about 1 wt. % to about 10 wt. %.

For example, the bioplastic composition can include at least one starch at a concentration between 2 wt. % and 25 wt. %, at least one plasticizer at a concentration between 40 wt. % and 65 wt. %, and at least one acid at a concentration between 1 wt. % and 10 wt. %. The bioplastic composition can include 11.0% starch, 49.4% glycerin, and 37.6% water, and 2.0% acid.

The bioplastic composition can include at least one starch at a concentration between 5 wt. % and 20 wt. %. The bioplastic composition can include at least one starch at a concentration between 7 wt. % and 20 wt. %. The starch can be corn starch, cassava starch, arrowroot starch, potato starch, taro starch, sweet potato starch, tannia starch, or combinations thereof.

Starchy tubers are indigenous to tropical, developing regions, and are abundant there. These plants constitute the fourth largest source of calories for humans in these areas, and as such are commonly cultivated. These sources may not have as high a concentration of starch as potatoes (approximately 85%), but they can serve as substitute starch sources. Cassava, also known as manioc, tapioca, and yucca (*Manihot esculenta*), was originally native to South and Central America, but has since been spread to most inhabited, tropical regions. The roots of this plant form large tubers which contain 35% starch. Arrowroot (*Maranta arundinacea*) is a tropical herbaceous perennial found in the West Indies, Brazil, and China. This plant contains rhizomes which are composed of 20% starch. Taro (*Colocasia esculenta*) is broad-leafed tuberous plant native to the Pacific islands, South America, Southern Asia, West Arica, and the Caribbean islands. Taro corms are the central stalks of the plant, and contain 25% starch. Tannia, also known as yautia or new cocoyam (*Xanthosoma sagittifolium*) is a bladed plant native to the Caribbean and Africa. The corm of this plant contains 25% starch, and is similar in composition to that of taro.

The ranges of these plants cover the majority of tropical regions. The starches are all chemically similar, and can be extracted easily with no sophisticated machinery. Using these plants, highly efficient starch sources are available throughout the tropics. They are abundant enough to be used for non-dietary purposes, and the hardiness of these plants lends them to being produced in large quantities with minimal maintenance and cost. While these sources of starch may not be as high in terms of starch content as potatoes, these plants could serve as substitutes in regions where *Solanum tuberosum* is unavailable, and their wide range of growth allows for localized production in any environment. Because of this, starches are very promising for use as monomer sources in the developing world.

The production of bioplastics from starch requires both an acid and a plasticizing agent, which can also be biologically derived to increase environmental sustainability. The most promising choices for these reactants are acetic acid and glycerin, respectively. Both of these substances can be produced through non-synthetic methods, and in certain embodiments, starch serves as the starting material. In certain embodiments, yeast metabolizes starches, fermenting them into simple sugar alcohols, including glycerin. The addition of water to the yeast and water mixture would cause the starches and microbes to float and the glycerin to sink, effectively separating it for use in its pure form. Through this process, glycerin can be produced from any starch source without any machinery or synthetic materials. Moreover, the fermentation of sugar can be operated to yield acetic acid. Complex carbohydrate chains such as starches can be broken down by microbes, and then fermented into an acid of the desired concentration. Thus in certain embodiments, one starch source could be used to produce all three reactants necessary to produce a bioplastic compositions. Starch can be used in its raw form as the monomer source, and fermented to provide both the acid and plasticizing agent.

Embodiments disclosed herein include bioplastic compositions containing a starch, a plasticizer, and an acid. The compositions contain at least one starch at a concentration between about 2 wt. % to about 40 wt. %, at least one plasticizer at a concentration between about 30 wt. % to about 65 wt. %, and at least one acid at a concentration between about 1 wt. % to about 10 wt. %. The bioplastic composition can include at least one starch at a concentration between 2 wt. % and 25 wt. %, at least one plasticizer at a concentration between 40 wt. % and 65 wt. %, and at least one acid at a concentration between 1 wt. % and 10 wt. %. The bioplastic composition can include 11.0% starch, 49.4% glycerin, and 37.6% water, and 2.0% acid.

The bioplastic composition can include at least one starch at a concentration between 5 wt. % and 20 wt. %. The bioplastic composition can include at least one starch at a concentration between 7 wt. % and 20 wt. %. The bioplastic composition can include at least one starch at a concentration between 9 wt. % and 20 wt. %. The bioplastic composition can include at least one starch at a concentration between 11 wt. % and 20 wt. %. The bioplastic composition can include at least one starch at a concentration between 7 wt. % and 18 wt. %. The bioplastic composition can include at least one starch at a concentration between 7 wt. % and 16 wt. %. The bioplastic composition can include at least one starch at a concentration between 7 wt. % and 14 wt. %. The bioplastic composition can include at least one starch at a concentration between 7 wt. % and 12 wt. %. The bioplastic composition can include at least one starch at a concentration between 8 wt. % and 18 wt. %. The bioplastic composition can include at least one starch at a concentration between 9 wt. % and 15 wt. %. The starch can be corn starch, cassava starch, arrowroot starch, potato starch, taro starch, sweet potato starch, tannia starch, or combinations thereof.

The bioplastic composition can include at least one plasticizer at a concentration greater than 40 wt %. Embodiments can also include bioplastics that contain one or more plasticizers at a concentration between 40 wt. % and 65 wt. %. Embodiments can also include bioplastics that contain one or more plasticizers at a concentration between 42 wt. % and 65 wt. %. Embodiments can also include bioplastics that contain one or more plasticizers at a concentration between 44 wt. % and 65 wt. %. Embodiments can also include bioplastics that contain one or more plasticizers at a concentration between 46 wt. % and 65 wt. %. Embodiments can also include bioplastics that contain one or more plasticizers at a concentration between 48 wt. % and 65 wt. %. Embodiments can also include bioplastics that contain one or more plasticizers at a concentration between 49 wt. % and 65 wt. %. Embodiments can also include bioplastics that contain one or more plasticizers at a concentration between 40 wt. % and 65 wt. %. Embodiments can also include bioplastics that contain one or more plasticizers at a concentration between 40 wt. % and 63 wt. %. Embodiments can also include bioplastics that contain one or more plasticizers at a concentration between 40 wt. % and 61 wt. %. Embodiments can also include bioplastics that contain one or more plasticizers at a concentration between 40 wt. % and 59 wt. %. Embodiments can also include bioplastics that contain one or more plasticizers at a concentration between 40 wt. % and 57 wt. %. Embodiments can also include bioplastics that contain one or more plasticizers at a concentration between 40 wt. % and 55 wt. %. Embodiments can also include bioplastics that contain one or more plasticizers at a concentration between 40 wt. % and 53 wt. %. Embodiments can also include bioplastics that contain one or more plasticizers at a concentration between 45 wt. % and 55 wt. %. Plasticizers can be one or more of polyhydric alcohol plasticizers, such as sugars, sugar alcohols, or polyols such as ethylene glycol, glycerin, propylene glycol, dipropylene glycol, butylene glycol, and hexane triol. The increased amount of plasticizer in the bioplastic composition allows for a more pure final product. The relatively higher amount of plasticizer ensures that a large portion to substantially all polymer molecules in the starch are exposed to the plasticizer, thus making the final properties of the bioplastic material more consistent. Many plasticizers (notably glycerin) are also natural preservatives, which is important for a bioplastic material.

The bioplastic composition can include at least one acid at a concentration less than 10 wt %. Acids as used herein can be organic or inorganic acids, and certain compositions can include one or more of a carboxylic acid, a phosphoric acid, a sulfonic acid, a boric acid, or salts of these compounds such that they form acids when used as aqueous solutions. Certain embodiments include weak acids. Certain embodiments include the use of an acid derived from natural sources such as acetic acid derived from enzymatic digestion of plant based starches.

Embodiments can also include bioplastics that contain one or more acids at a concentration between 0.5 wt. % and 10 wt. %. Embodiments can also include bioplastics that contain one or more acids at a concentration between 1 wt. % and 10 wt. %. Embodiments can also include bioplastics that contain one or more acids at a concentration between 1.25 wt. % and 10 wt. %. Embodiments can also include bioplastics that contain one or more acids at a concentration between 1.5 wt. % and 10 wt. %. Embodiments can also include bioplastics that contain one or more acids at a concentration between 2 wt. % and 10 wt. %. Embodiments can also include bioplastics that contain one or more acids at a concentration between 3 wt. % and 10 wt. %. Embodiments can also include bioplastics that contain one or more acids at a concentration between 0.5 wt. % and 8 wt. %. Embodiments can also include bioplastics that contain one or more acids at a concentration between 0.5 wt. % and 6 wt. %. Embodiments can also include bioplastics that contain one or more acids at a concentration between 0.5 wt. % and 5 wt. %. Embodiments can also include bioplastics that contain one or more acids at a concentration between 1 wt. % and 5 wt. %.

Embodiments disclosed herein include bioplastic compositions containing a starch, a plasticizer, and an acid, where ratio of the least one starch to at least one plasticizer to at least one acid is a weight ratio of about 10:2:2 to about 10:4:4. Certain bioplastic compositions disclosed herein have a weight ratio of the starch to the plasticizer to the acid at about 10:3:3.

Certain embodiments described herein include methods of making the bioplastic compositions. An aqueous mixture of at least one plasticizer and at least one acid was blended and heated to between 80 and 120° C. to produce a first aqueous mixture. At least one starch was added to the first aqueous mixture to produce a second aqueous mixture. The second aqueous mixture was subjected to heating and blending such the starch was exposed to the plasticizer and acid. Temperature was maintained at between 80 and 120° C. Molten bioplastic polymer began precipitating out. Further heat and mixing were provided to complete the reaction, and any residual liquid was separated from the bioplastic polymer precipitate to produce the bioplastic composition containing between 2 wt. % and 25 wt. % of at least one starch, between 40 wt. % and 65 wt. % of at least one plasticizer, and between 1 wt. % to 10 wt. % of at least one acid. The biopolymer precipitate can be separated using evaporation or filtration or any other separation method to remove the residual liquid.

Temperature can be maintained at between 85 and 115° C., or between 90 and 110° C., or between 80 and 110° C. The starch can be directly added to the aqueous mixture of plasticizer and acid, and continuous subsequent blending can result in a homogenous mixture. In other aspects, the starch can be slowly added to the aqueous mixture of plasticizer and acid, as the mixture is being heated and blended. The blending can be achieved by mechanical devices known in the art, such as stirrers, mixers, or agitators. These devices can be fitted with temperature control jackets, so as to maintain the temperature of the first and second aqueous mixtures at the desired temperatures.

To test the thermal resistivity of these materials, an apparatus as shown in FIG. 1 was constructed. FIG. 1 is an illustration of a system 100 to measure the thermal resistivity of a test plastic material, such as the bioplastic composition or a polysytrene material. A hollow apparatus 101 made of thermally resistive material was fitted at one end with a heat source 102. Subsequent to the heat source 102 was the part of the apparatus forming the first air chamber 104. A first temperature sensor 106 measured the temperature of the air in the first air chamber 104. The apparatus 101 is adapted to fit the test plastic material 106 between the parts constituting the first air chamber 104 and the second air chamber 110. The second temperature sensor 112 measured the temperature of the air in the second air chamber 110.

EXAMPLES

The following examples are provided to more fully illustrate some of the embodiments disclosed hereinabove. It should be appreciated by those of ordinary skill in the art that the methods disclosed in the examples that follow represent techniques that constitute illustrative modes for practice of the disclosure. Those of ordinary skill in the art should, in light of the present disclosure, appreciate that many changes can be made in the specific embodiments that are disclosed and still obtain a like or similar result without departing from the spirit and scope of the disclosure.

Example 1

To obtain starch, white Maine potatoes (*Solanum tuberosum*) were peeled and cut into pieces smaller than a cubic inch. These pieces were slowly added to a blender until it became full of starch paste. This slurry was then strained to remove any excess water, until the paste did not drip when left stationary. A 532 mL quantity of this paste was then mixed with 177 mL each of glycerin and acetic acid, and stirred continually on heat (approximately 90° C.). When the mixture began to thicken and become more translucent, it was transferred to a metal pan (40 cm by 50 cm) and put into an oven at 80° C. for 50 minutes to facilitate drying. When removed, the plastic was left to air-dry overnight. The produced material mimicked a rubber in properties and appearance, and further investigation revealed that a polymerization reaction had in fact taken place.

Example 2

To begin determining the production ratio for a thermally resistive plastic, two more batches were produced using the same procedure and different ratios. One batch was produced with 532 mL of starch paste to 89 mL each of acetic acid and glycerin, and another with 532 mL of starch paste to 44 mL each of glycerin and acetic acid. Of the three batches, the 532 mL to 89 mL ratio was determined to have relatively better performance for use as insulation in terms of mechanical properties. Concentration of glycerin higher than 65 wt % and acetic acid lower than 1 wt % yielded a material too flexible and easily torn for use as a building material, while the lower concentration of glycerin than 20 wt % yielded a brittle, rigid material which could not be easily manipulated or used in the confined spaces where insulation is most often utilized. Furthermore, relative lower amounts of glycerin, such as less than 20 wt % impacts the resistance to decomposition, and makes the bioplastic compositions described herein much less homogeneous.

Example 3

Further tests were conducted to determine the ideal ratio for insulation using these reactants. Three more batches were produced, with 10:2:2, 10:3:3, and 10:4:4 ratios of starch paste to glycerin to acetic acid using the same production method as described previously. These samples were then pressed into disks of uniform thickness (approximately 1 cm) and dried. To test the thermal resistivity of these materials, an apparatus as shown in FIG. 1 was constructed to measure heat diffusion across a boundary. A PVC pipe was cut into two pieces length-wise, and the bioplastic test samples were placed between them. Temperature probes were then inserted into the pipe on either side of the plastic, and one side was heated using a 1300 Watt hair dryer.

The difference in temperature was measured continually and graphed using Microsoft Excel. The apparatus was then cooled back to room temperature, and the process was repeated for all three samples and a polystyrene insulation control of the same thickness. All three bioplastic samples performed better in resisting heat diffusion than the control, and the 10:3:3 ratio performed best, followed by the 10:4:4 and finally the 10:2:2 ratios.

The ten-second averages of difference in temperature across a boundary of bioplastic were found, and are displayed below in Table 1. The left column (t) shows time, and each of the other columns ($\Delta T_c$, $\Delta T_3$, $\Delta T_2$, and $\Delta T_1$) shows the temperature difference across a given boundary at that time, averaged over 10 seconds. $T_c$ is a polystyrene insulation sheet used as a control, $T_1$ is the test of the 10:3:3 ratio, $T_2$ is the 10:4:4 ratio, and $T_3$ is the 10:2:2 ratio. A large temperature gradient signified an effective insulator, because it is slowing the flux of heat from one side to another.

Table 1 presents the summarized data used to compare thermal resistivity of different ratios in plastic production.

| | Ten-Second Averages of Temperature Gradient | | | |
| --- | --- | --- | --- | --- |
| t (s) | $\Delta T_c$ (° C.) | $\Delta T_3$ (° C.) | $\Delta T_2$ (° C.) | $\Delta T_1$ (° C.) |
| 10 | 3.67 | 3.15 | 3.19 | 3.58 |
| 20 | 10.44 | 11.36 | 12.33 | 11.68 |
| 30 | 15.84 | 19.60 | 21.50 | 19.72 |

-continued

Ten-Second Averages of Temperature Gradient

| t (s) | $\Delta T_c$ (° C.) | $\Delta T_3$ (° C.) | $\Delta T_2$ (° C.) | $\Delta T_1$ (° C.) |
|---|---|---|---|---|
| 40 | 21.58 | 26.69 | 29.90 | 27.16 |
| 50 | 27.95 | 32.79 | 37.31 | 33.86 |
| 60 | 33.34 | 37.93 | 43.58 | 39.69 |
| 70 | 37.68 | 42.23 | 48.95 | 44.93 |
| 80 | 41.14 | 45.97 | 53.46 | 49.61 |
| 90 | 43.99 | 49.25 | 57.21 | 53.61 |
| 100 | 46.33 | 52.04 | 60.43 | 57.38 |
| 110 | 48.22 | 54.30 | 63.11 | 61.93 |
| 120 | 49.65 | 56.24 | 65.46 | 66.41 |
| 130 | 50.73 | 57.92 | 67.44 | 70.27 |
| 140 | 51.67 | 59.31 | 69.36 | 73.30 |
| 150 | 52.56 | 60.43 | 71.69 | 75.74 |
| 160 | 53.25 | 61.53 | 73.51 | 78.01 |
| 170 | 53.80 | 62.45 | 75.51 | 79.86 |
| 180 | 54.21 | 63.25 | 76.83 | 81.41 |
| 190 | 54.54 | 64.15 | 77.98 | 82.66 |
| 200 | 54.86 | 64.97 | 78.86 | 83.73 |
| 210 | 55.12 | 65.73 | 79.67 | 84.59 |

Figure 2:
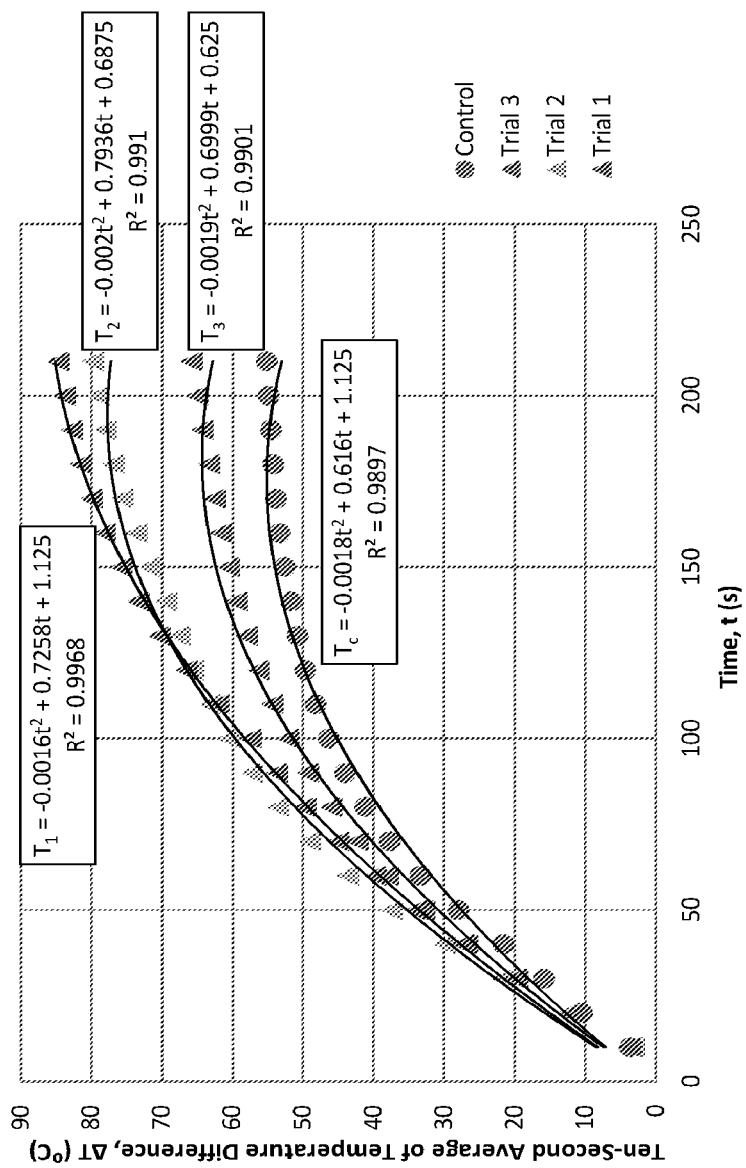
FIG. 2 is a graphical representation of the insulation properties of bioplastic compositions, according to an exemplary embodiment of the invention.

FIG. 2 is a comparative graph of temperature across different insulation boundaries over time. $T_c$ is a polystyrene insulation sheet used as a control, $T_1$ is the test of the 10:3:3 ratio, $T_2$ is the 10:4:4 ratio, and $T_3$ is the 10:2:2 ratio.

Example 4

A batch of plastic was produced using pure potato starch in place of the blended potato paste in an attempt to reduce moisture. Glycerin and a 5% acetic acid solution (237 mL each) were combined in a pan and heated. Then 237 mL of starch was added to the mixture and stirred until completely dissolved. Approximately around 50 g of starch was then continually added until the concentration became high enough that the polymerization reaction began to take place. Plastic began to precipitate from the solution until the entire mixture had become a molten solid very similar in appearance to previously produced plastic samples. All liquid was either consumed in the reaction or evaporated.

Figure 3:
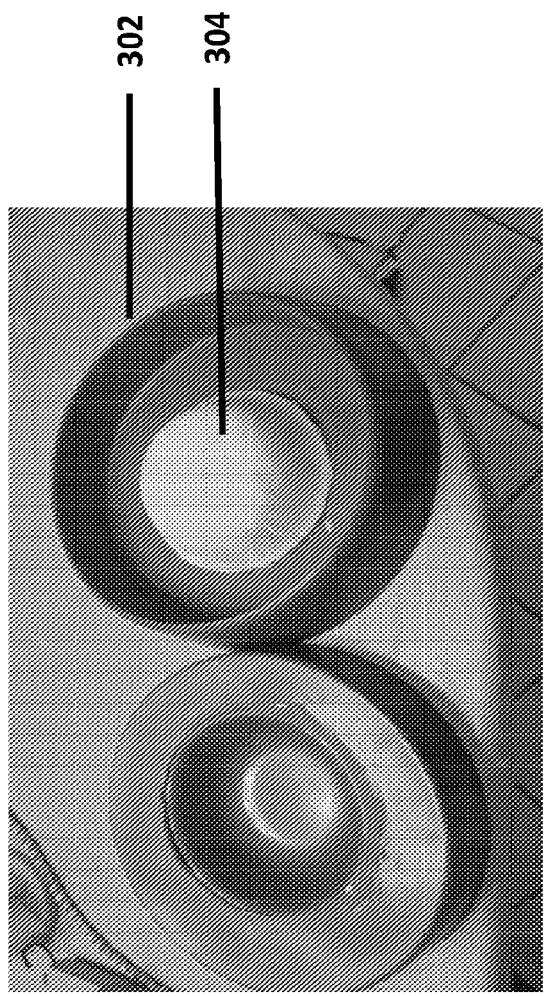
FIG. 3 is a photographic image of a mold and a cast made from a bioplastic composition, according to an exemplary embodiment of the invention.

FIG. 3 is a photograph of the mold and cast made according to an exemplary embodiment. As shown in FIG. 3, a portion of the sample was placed into a mold 302 obtained from United Solutions in the shape of a bowl and compressed. Two days later, the mold was removed and the quality of the casting 304 was observed and compared to petroleum-based polymers. This determined that the bioplastic is very capable of being used in compression molding. The remainder of the sample was spread into a sheet and placed in an oven at 93° C. for an hour. After this time, the sheet was removed and assessed with additional tests.

Example 5

Further testing was conducted to determine the viability of the idealized potato paste polymer and the pure starch polymer for use in different applications through numerous qualitative experiments and observations. To determine whether the plastic would be susceptible to mold and fungus, samples of both the potato paste and pure starch plastics were tested for resistance to facilitated decay. Five samples each of the 10:3:3 ratio and the pure-starch plastic were wet with 35° C. water, swabbed with household dust, and sealed in plastic bags. Two samples of each plastic were wet, swabbed with soil, and sealed in plastic bags. Two more samples were placed in a sugar supply to facilitate bacterial growth and then sealed in plastic bags. These samples were kept moist and carefully monitored for decay.

A test of flammability was conducted by holding a flame to a sample of each bioplastic. The plastic superficially darkened where it contacted the flame, but this ashy layer was removed with a wet cloth to allow for accurate observation of the response of the plastic to flame. It was found that the pure-starch plastic melted, which allowed for further testing. A new casting was produced using re-melted plastic. The remainder of the pure-starch plastic sheet which had been previously produced was torn into pieces approximately 25 cm square, and tested for different melting methods. One piece was placed in a pan on an 80° C. stove, and another was placed in a 1100 Watt microwave on the high setting. The sample placed in the pan began to smolder, and was removed to save the sample for other testing. The microwave sample bubbled, released a large quantity of vapor, and melted into a clear plastic resin. As this method of exposing to radiation was more effective than contact with a source of heat, the remainder of the plastic was melted down using this method. It was then poured into the mold and compressed using the same procedure as the previous casting. After 8 hours of cooling, the mold was removed, and the quality of the cast was observed.

Using this new data, and observations of mechanical properties, each plastic was given a rank in several categories as shown in Table 2 and used in a decision matrix to determine the ideal composition ratio for use as insulation.

TABLE 2

| | | Decision Matrix | | |
|---|---|---|---|---|
| Criteria | Max Score | 10:2:2 Ratio | 10:3:3 Ratio | 10:4:4 Ratio |
| Resistance to Tearing | 10 | 10.0 | 6.7 | 3.3 |
| Thermal Resistivity | 10 | 6.7 | 10.0 | 3.3 |
| Ease of Drying | 10 | 3.3 | 6.7 | 10.0 |
| Moldability | 7 | 2.3 | 7.0 | 4.7 |
| Flexibility | 7 | 10.0 | 6.7 | 3.3 |
| Resistance to Water | 5 | 1.7 | 3.3 | 5.0 |
| Total | | 34.0 | 40.3 | 29.7 |
| Possible | | 49.0 | 49.0 | 49.0 |
| Percent | | 69.0 | 82.0 | 61.0 |

Using this decision matrix shown in Table 2, it was determined that a 10:3:3 ratio would be more suitable for production of a thermally resistive, mechanically usable plastic.

Example 6

Figure 4:
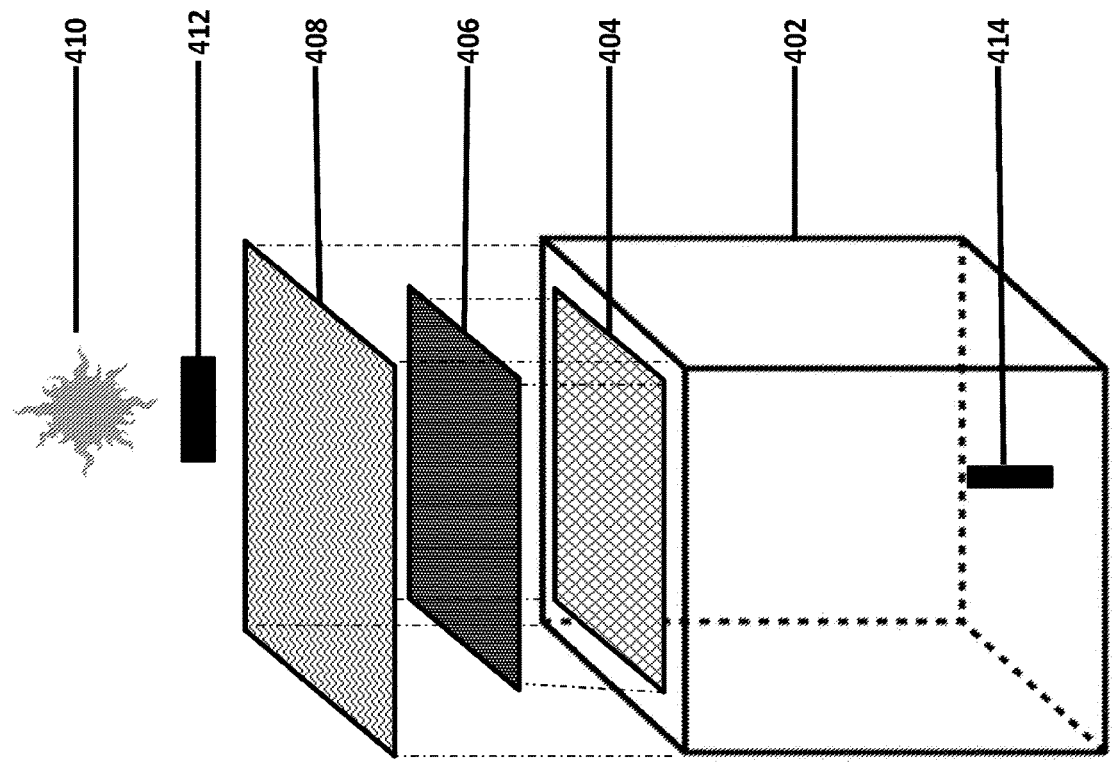
FIG. 4 is an illustration of a particular apparatus constructed to analyze thermal properties of bioplastic compositions, according to an exemplary embodiment of the invention.

To determine a more accurate measurement of the thermal properties of the polymer, an apparatus similar to the illustration in FIG. 4 was constructed. The top surface of a hollow wooden container 402 was fitted with a wire mesh 404. Test plastic materials were designed as sheets 406 such that they would fit on the top of the wire mesh 404. Corrugated metal sheet 408 was placed on top of the test plastic sheet 406 to mimic the placement of a roof above insulation. A heat source 410 was used above the outside the corrugated metal sheet 408 to mimic the heat from the sun. Temperature sensors 412 and 414 were placed outside the corrugated metal sheet 408 and inside the container 402.

In an exemplary structure, a large (roughly 60 cm square) sheet of pure-starch plastic was produced using the same procedure as described previously and using 1774 mL of starch, 1597 mL of glycerin, and 1597 mL of acetic acid solution. The plastic was spread into the desired shape, and was cooled and flipped regularly to ensure uniform quality. When it had completely set, testing was begun. A piece of Shelterguard corrugated roofing metal was obtained to approximate the style of roofing used in the developing world. A simulation of a wooden shelter was constructed using wooden beams and plywood, and temperature probes were placed both above and below the roof. A grow light fit with a heat lamp bulb was used as a model sun, and positioned above the roof. The plastic was placed directly under the roof, cut to the appropriate size, and held in place with a thin metal mesh.

Data collection was begun on LoggerPro, the light was turned on, and the difference in temperature on either side of the roof was measured at 15 second intervals. Data collection was allowed to continue for 50 minutes. This was repeated without insulation as a control setting after the apparatus had been cooled to the same starting temperature.

Every sample of plastic produced was compared to the other batches, and variations in different properties (including ease of production) were recorded. These observations were used to determine ideal production methods and to obtain qualitative data for each batch.

Table 3 and Table 4 show the values recorded during the roofing simulation test measured at 3 minute intervals. Time (t) is the duration of the trial, measured in minutes, $T_{inside}$ is the temperature measured inside of the mock shelter, $T_{outside}$ is the ambient temperature measured directly above the roof, $\Delta T$ is the difference between $T_{outside}$ and $T_{inside}$, and Q is the amount of heat which has permeated through the roof to the inside, measured in increase in temperature from t=0 minutes using the $T_{inside}$ measurements. A low Q signifies an effective insulator because it means that little heat has permeated the barrier. A high Q means that the metal roof is radiating much of its heat into the shelter. The control test consisted of a metal roof and no insulation, while the insulation test utilized a sheet of pure-starch plastic to regulate the internal temperature.

TABLE 3

Roof Control Test with No Insulation

| Time (minutes) | $T_{inside}$ ° C. | $T_{outside}$ ° C. | $\Delta T$ ° C. | Q ° C. |
| --- | --- | --- | --- | --- |
| 0 | 20.86 | 21.12 | 0.26 | 0.00 |
| 3 | 21.20 | 26.19 | 4.99 | 0.34 |
| 6 | 21.77 | 28.25 | 6.48 | 0.91 |
| 9 | 22.40 | 28.81 | 6.42 | 1.53 |
| 10 | 22.92 | 29.06 | 6.14 | 2.06 |
| 15 | 23.35 | 29.12 | 5.78 | 2.48 |
| 18 | 23.72 | 29.06 | 5.35 | 2.85 |
| 21 | 24.01 | 28.75 | 4.74 | 3.15 |
| 24 | 24.27 | 28.50 | 4.23 | 3.40 |
| 27 | 24.50 | 28.50 | 4.00 | 3.63 |
| 30 | 24.72 | 28.44 | 3.71 | 3.86 |
| 33 | 24.91 | 28.37 | 3.47 | 4.05 |
| 36 | 25.09 | 28.50 | 3.41 | 4.22 |
| 39 | 25.26 | 28.31 | 3.06 | 4.40 |
| 42 | 25.39 | 28.44 | 3.05 | 4.53 |
| 45 | 25.50 | 28.31 | 2.81 | 4.64 |

TABLE 4

Roof Test with Bioplastic Insulation

| Time (minutes) | $T_{inside}$ ° C. | $T_{outside}$ ° C. | $\Delta T$ ° C. | Q ° C. |
| --- | --- | --- | --- | --- |
| 0 | 20.67 | 20.81 | 0.14 | 0.00 |
| 3 | 20.71 | 30.62 | 9.92 | 0.04 |
| 6 | 20.76 | 33.56 | 12.81 | 0.08 |
| 9 | 20.81 | 34.56 | 13.75 | 0.14 |
| 12 | 20.89 | 34.62 | 13.73 | 0.22 |
| 15 | 20.98 | 34.81 | 13.83 | 0.31 |
| 18 | 21.10 | 34.81 | 13.71 | 0.43 |
| 21 | 21.21 | 34.62 | 13.41 | 0.54 |
| 24 | 21.34 | 34.81 | 13.47 | 0.67 |
| 27 | 21.47 | 34.75 | 13.28 | 0.80 |
| 30 | 21.59 | 34.69 | 13.09 | 0.92 |
| 33 | 21.72 | 34.69 | 12.96 | 1.05 |
| 36 | 21.84 | 34.75 | 12.91 | 1.16 |
| 39 | 21.95 | 34.62 | 12.67 | 1.28 |
| 42 | 22.05 | 34.56 | 12.51 | 1.38 |
| 45 | 22.17 | 34.69 | 12.52 | 1.49 |

Figure 5:
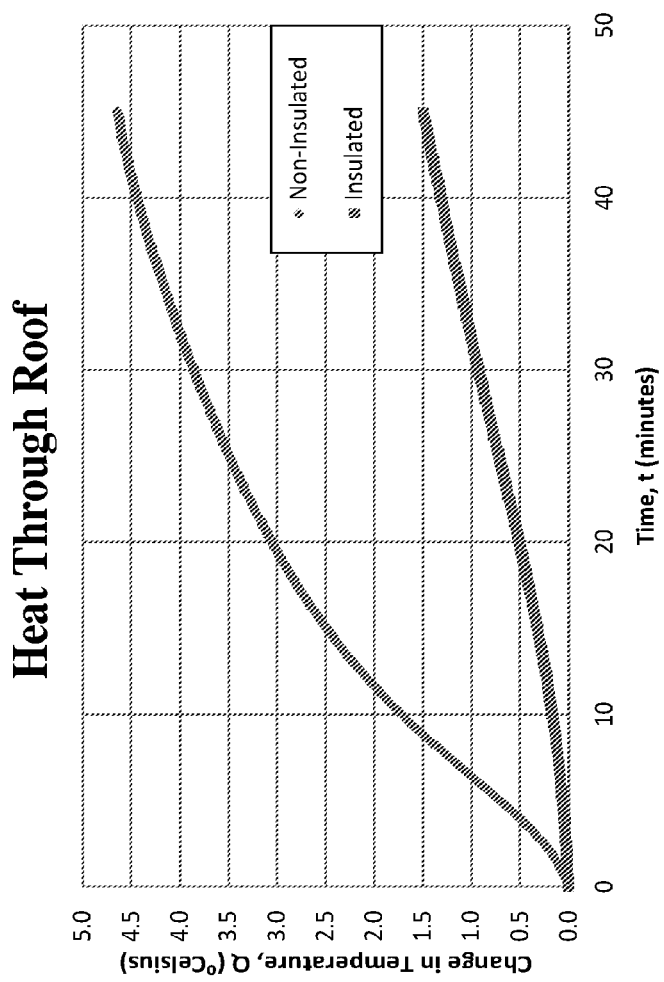
FIG. 5 is a graphical representation of the heat transferred through the roof, throughout the duration of both the control and insulation tests using a bioplastic composition, according to an exemplary embodiment of the invention.
Figure 6:
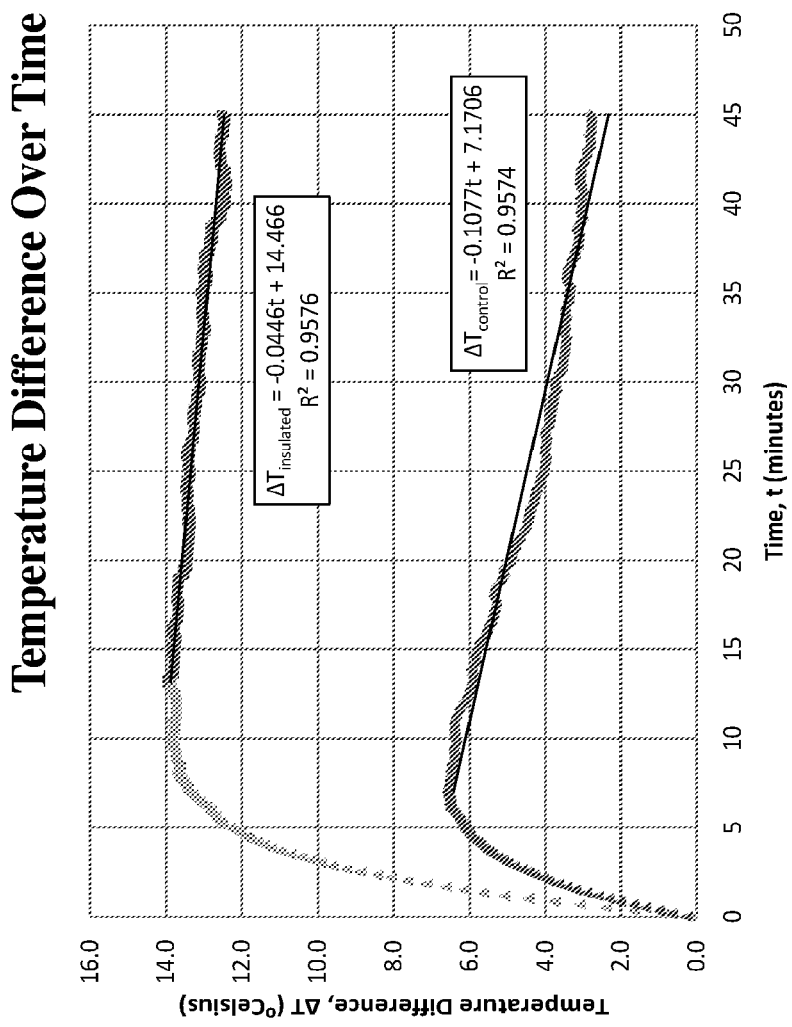
FIG. 6 is a graphical representation of the temperature difference measured to determine thermal insulative properties of a bioplastic composition, according to an exemplary embodiment of the invention.

FIG. 5 shows a comparative graph of Q, the heat transferred through the roof, throughout the duration of both the control and insulation tests. FIG. 6 shows a comparative graph of $\Delta T$, the temperature difference across the roof, throughout the duration of both the control and insulation tests, shown with data after the maximum differences separated and fit with regression lines.

Example 7

To determine whether the same bioplastic could be produced using other sources of starch, another batch was produced using yucca cassava, a starchy tuberous plant indigenous to South America. The production process of this plastic mirrored the method used for the three potato based plastics, to ensure accurate comparisons between them. Pieces of cassava were cut and blended into a paste. This paste was then mixed in a 3:1:1 ratio of paste to glycerin to 5% acetic acid solution (532 mL, 177 mL, and 177 mL, respectively) and heated to approximately 90° C. The mixture was stirred continuously until the reaction was completed, at which point the plastic was spread into a sheet on a metal pan and placed in an oven at 100° C. for 1 hour to dry. The cassava polymer was then compared to the potato bioplastics using qualitative assessments of mechanical properties and observations of differences during production.

Example 8

To determine whether a similar polymer could be produced using more common starch sources, another batch was produced using corn, one of the most common agricultural products in the United States. The production process of this plastic was the same one used for the potato and yucca plastics, to ensure accurate comparisons between them. Pure corn starch was obtained. This powder was added to a solution of 50% glycerin and 50% acetic acid solution in a pot. The solution was stirred at approximately 90° Celsius until plastic began to precipitate out of the solution. This process was continues until the solution had completely evaporated, and the plastic had congealed in the bottom of the pot. This was spread out onto an oven tray, and left to dry for several days. The differences in production and final product qualities were recorded, and compared to the potato starch plastic.

Example 9

To determine the density of the material, a sample was taken from the existing stock and measured on the scale to be 45.4 g. The graduated cylinder was then filled to the 150 mL mark with water, and the sample was completely submerged. The water level rose to the 181 mL mark, meaning that the sample had a volume of 28 mL. The density of the plastic was determined to be 1.621 g/mL from the test described on page 26. This is higher than the density of polystyrene, which is 1.05 g/mL.

Example 10

To determine the specific heat of the plastic, it was necessary to obtain a different sample, as the density sample was saturated. The mass of the new sample was measured on the scale as 97.2 g. The plastic sample was then attached to a temperature probe and cooled to −17.1° C. in a freezer. A different temperature probe was simultaneously used to determine the temperature of 1 L of water. The water was at 29.0° C. Using the definition of specific heat, $$c = \frac{J}{g *°C},$$

an equation was set up to determine the specific heat of the plastic (c) for an observed equilibrium temperature of the water with plastic submerged ($T_f$) given the specific heat of water (4.179). This equation was:

$$1000*4.179*(29-T_f)=97.2*c*(T_f+17.1)$$

The plastic sample was submerged in the water, and the temperature of the water was monitored.

In the specific heat test described on page 26, the results were much less ordinary. Using the equation $1000*4.179*(29-T_f)=97.2*c*(T_f+17.1)$ and a $T_f$ of 25.1° C., the specific heat was determined to be 3.97 J/g° C., compared to polystyrene's specific heat of 1.05 J/g° C. ("Polystyrene", 2013).

Example 11

Figure 7:
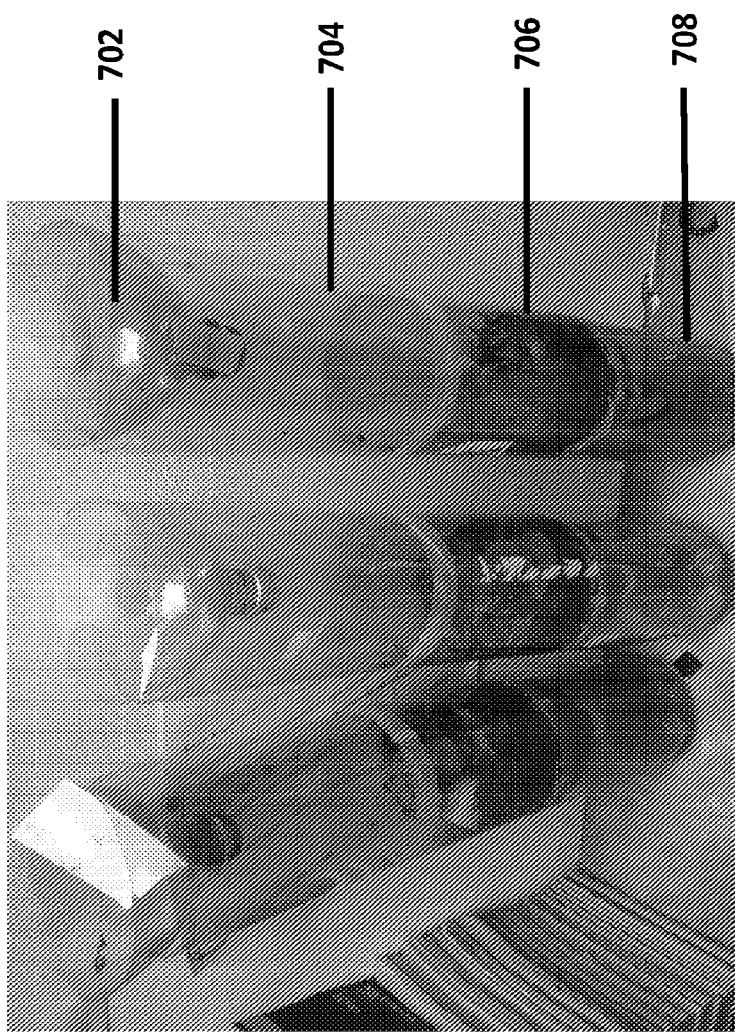
FIG. 7 is a photographic image of decomposition columns, designed to analyze the decomposition properties of bioplastic compositions, according to an exemplary embodiment of the invention.

To determine whether this plastic could be safely disposed of in landfills, decomposition columns were constructed as shown in FIG. 7 and used to decompose the polymer. A decomposition investigation apparatus was constructed with four sections. The first section 702 served to limit the release of gas and entry of air from second section 704 and also as a funnel to deliver the warm water to the decomposition mix in third section 706. These columns were filled with dirt and leaves to constitute the decomposition mix in third section 706. At that time, three samples of the plastic were cut and massed using a metric scale. These three test plastic materials were placed along with the decomposition mix in third section 706, and left to begin decomposition for three days. Warm water was poured into each column each morning or the three days. The fourth section 708 of the column served as the receptacle to collect any water or other materials exiting third section 706 of the column. The columns were left in a dark closet until they began to smell strongly enough that they had to be moved. At that point, the columns were removed from the closet and observed for signs of decomposition or loss of mass.

When an attempt was made to remove the plastic from the columns after 21 days of decomposition, it became apparent that no measurements could possibly be made. When a corner of the plastic samples was clasped between tongs and pulled, it detached from the rest of the sample and degraded into several smaller pieces. The rest of the sample was pulled out of the column with bare hands, and it also fell apart instantly. It was observed that the plastic was coated in a layer of thick black mold, and smelled of decomposition. It can be conclusively stated that the polymer, when wet and in the presence of decomposers, biodegrades completely within 1 month.

Example 12

Figure 8:
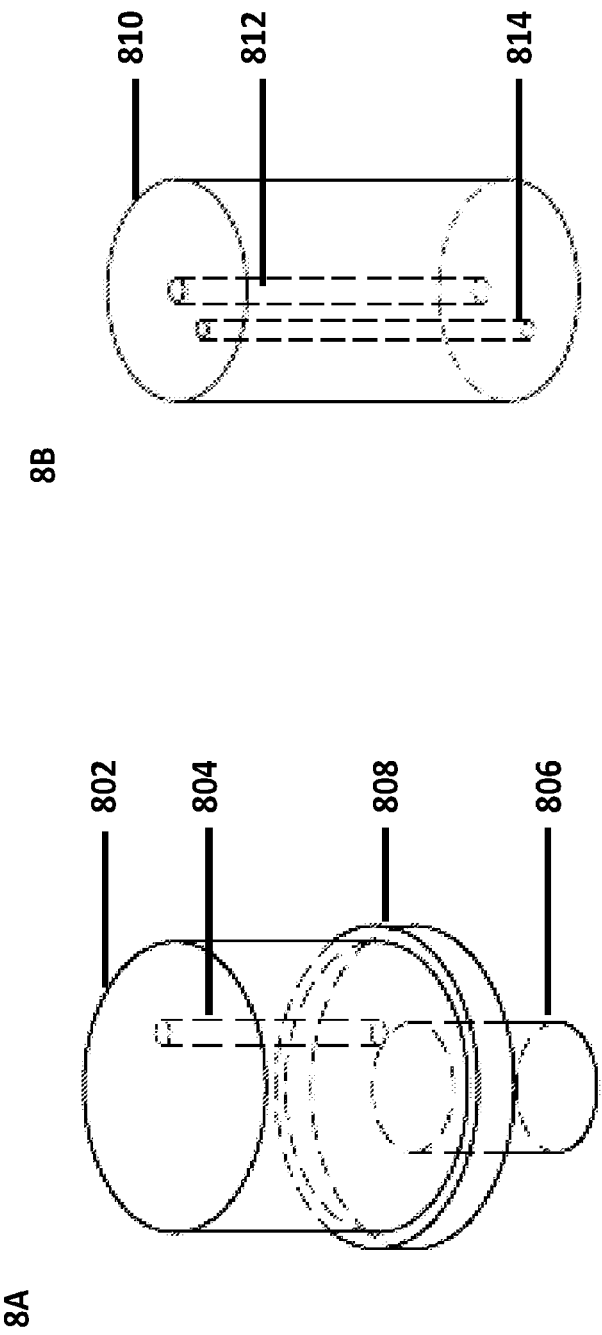
FIGS. 8A and 8B are illustrations of a particular apparatus constructed to analyze one-dimensional heat transfer properties of bioplastic compositions, according to an exemplary embodiment of the invention.

A one-dimensional heat transfer question was evaluated by constructing a particular apparatus as shown in FIG. 8. The apparatus required aluminum components to be machined, so these parts were sketched in SolidWorks, and converted to a schematic with dimensions labeled. FIG. 8A is an illustration of the "cold" aluminum component 802, with a slot 804 for a thermal couple. Protrusion 806 was designed to hold the apparatus up higher in the water, and also to provide greater surface area so the aluminum would be cooled more effectively. Lip 808 held the PVC tube up out of the water, and again provided greater surface area. FIG. 8B is an illustration of the "hot" aluminum component 810 that has a slot 812 for a heater and a slot 814 for a thermal couple. The parts were made of aluminum because it is so conductive that it is often assumed to be isothermal in thermal experiments. The pipe will be capped at one end, the "hot" component 810 will be placed directly below the cap. All of the input heat, then, will go in the opposite direction, towards the "cold" component 802 through a 1 cm piece of the plastic, cut with the sharp edge. With the surface temperatures of each aluminum piece being measured, the difference in temperature ($\Delta T$) can be calculated. This can be considered a one-dimensional problem because the PVC has a very low conductivity, and will be coated in thermally resistive tape, so it can be assumed to be a perfect resistor. The other end of the tube will have the "cold" component protruding, and this part will be submerged in ice water to maintain reasonable temperatures in this test, keeping one end at 0° C. This will allow the experiment to be modeled by Fourier's Law of Thermal Conduction, represented by the equation $$\frac{q}{A} = \frac{k\Delta T}{\Delta x},$$

where q is the heat input power, A is the cross sectional area of the tube, k is thermal conductivity, and $\Delta x$ is the thickness of the sample. All of these variables will be measured and know before the time of the experiment, and $\Delta T$ will be measures as described above. The outer diameter was machined to precisely it inside the PVC tube, and the inner diameter to precisely fit the heater. This apparatus was assembled, with both pieces of aluminum, the plastic, and the cap all prepared for the experiment. The heater and thermal couples had to be inserted after the heater has been calibrated at the appropriate power setting. The heater obtained has a listed power of 32 W, which is far too much for use in this experiment. Using Fourier's equation, this heater would tend towards of a temperature difference of 1900° C. when testing a plastic with a conductivity of 0.13, the same as polystyrene ("Polystyrene", 2013). It is predicted that this plastic will be similar, so the heater has to be reduced to 2% power using a Variac voltage monitor. This, using the same equation, would predict a temperature difference of 30° C. The heater had to be calibrated at that reduced power, to determine the exact experimental heat flux.

The data collected during the calibration of the heater is shown in the following Table 5, with the equivalent heat output ($q_{eq}$) calculated at every minute. The mass constant of 356 g and $C_{water}$ of 4.186 were used in calibrating the power of the heater. Time into the experiment (t) is shown in minutes, and the equivalent time in seconds, T (temperature of the water) is listed in ° C., and $q_{eq}$ is calculated using the equation $$q_{eq} = \frac{\Delta T * m_{water} * c_{water}}{\Delta t}.$$

TABLE 5

| t | | T | $q_{eq}$ |
|---|---|---|---|
| min | sec | (° C.) | W |
| 0 | 0 | 17.9 | N/A |
| 1 | 60 | 17.9 | 0.00 |
| 2 | 120 | 17.9 | 0.00 |
| 3 | 180 | 17.95 | 1.24 |
| 4 | 240 | 17.95 | 0.00 |
| 5 | 300 | 17.95 | 0.00 |
| 6 | 360 | 18 | 1.24 |
| 7 | 420 | 18 | 0.00 |
| 8 | 480 | 18.05 | 1.24 |
| 9 | 540 | 18.05 | 0.00 |
| 10 | 600 | 18.1 | 1.24 |
| 11 | 660 | 18.1 | 0.00 |
| 12 | 720 | 18.15 | 1.24 |
| 13 | 780 | 18.15 | 0.00 |
| 14 | 840 | 18.2 | 1.24 |
| 15 | 900 | 18.2 | 0.00 |
| 16 | 960 | 18.2 | 0.00 |
| 17 | 1020 | 18.25 | 1.24 |
| 18 | 1080 | 18.25 | 0.00 |
| 19 | 1140 | 18.25 | 0.00 |
| 20 | 1200 | 18.3 | 1.24 |
| 21 | 1260 | 18.3 | 0.00 |
| 22 | 1320 | 18.35 | 1.24 |
| 23 | 1380 | 18.35 | 0.00 |
| 24 | 1440 | 18.4 | 1.24 |
| 25 | 1500 | 18.4 | 0.00 |
| 26 | 1560 | 18.45 | 1.24 |
| 27 | 1620 | 18.45 | 0.00 |
| 28 | 1680 | 18.5 | 1.24 |
| 29 | 1740 | 18.5 | 0.00 |
| 30 | 1800 | 18.55 | 1.24 |

Using these equivalent power measurements, the average power of the heater was found to be 0.538 W. This value was used as the power of the heater in the conduction experiment.

A glass thermos was initially massed while empty, and the scale was zeroed at that mass. Then the thermos was removed and filled with water, and massed again to determine the mass of the water. Knowing this mass, and the specific heat of water, a magnitude of the energy input could be calculated from an observed temperature change rate. An apparatus was set up in which the heater and thermal couple were each suspended in the water, not touching the edges of the thermos and evenly spaced. This ensured that neither the thermos nor the proximity of the two devices would interfere in the measurements.

The Variac was set to about 2% voltage, and the heater was plugged in, starting the calibration process. The temperature of the water was recorded every minute in an already-formatted Excel spreadsheet, and the equivalent power at each measurement was calculated. These equivalent power readings were then considered, and the average was found by averaging the equivalent powers. The heater was then turned off and moved from the calibration apparatus to the machined hole in the "hot" component 510 of the conductivity testing apparatus. A thermal couple was also inserted into each aluminum component, and the "hot" side was capped with a PVC cap, with insulative tape inserted between the heater and the cap, for additional surety of insulation. The entire apparatus was then wrapped in a layer of this tape, and held in place with tape. The wires for the thermal couples were also secured with tape, to ensure no shift in the sensors once data collection began. A movement in the thermal couples would potentially vary the temperature observed, and lead to uncertainty.

The entire apparatus was then placed in a plastic bowl, which was filled with ice water. The water rose to the level of the pipe, but no further, to avoid interference as much as could be done. The heater was powered, and both thermal couples were monitored, with data being recorded every 5 minutes. When equilibrium $\Delta T$ had been reached for 15 minutes, that value was used to determine the material's conductivity. One of the thermal couples (in the "cold" side) became detached at approximately 58 minutes, causing it to register a considerably lower temperature. This measurement would have suggested a substantially lower conductivity, so the datum was discarded as misleading. Using the observed equilibrium $\Delta T$, the equation $$\frac{q}{A} = \frac{k \Delta T}{\Delta x}$$

was used to determine the conductivity (k) given the known area (A), thickness ($\Delta x$), and heater power (q). The constants used in calculating k during the conductivity experiment were A=0.00129 m², $\Delta x$=0.01 m and q=0.54 W.

The data collected in the conductivity experiment follows, with t (elapsed time) listed in both minutes and seconds, T shown for both the hot and cold aluminum components, the $\Delta T$ observed at that time ($T_{hot}-T_{cold}$), and the calculated conductivity ($k_{eq}$) for each data point. Conductivity was calculated using the equation $$\frac{q}{A} = \frac{k(\Delta T)}{\Delta x},$$

with q being the heat output of the heater, A being the cross-sectional area of the apparatus, $\Delta x$ being the thickness of the plastic sample, and $\Delta T$ being measured at each instant. Each variable except $\Delta T$ was measured before testing, and the values listed below are listed below:

When data collection was begun, data was collected and k was calculated after each 5-minute (300 second) interval, as displayed in the following Table 6:

TABLE 6

| t | | T | | | K |
|---|---|---|---|---|---|
| min | sec | hot (° C.) | cold (° C.) | $\Delta T$ (° C.) | $k_{eq}$ (W/m²K) |
| 0 | 0 | 18.1 | 18.1 | 0 | Infinite |
| 5 | 300 | 18.9 | 10.8 | 8.1 | 0.52 |
| 10 | 600 | 19.2 | 5.6 | 13.6 | 0.31 |
| 15 | 900 | 19.3 | 3.3 | 16 | 0.26 |

TABLE 6-continued

| t | | T | | | K |
|---|---|---|---|---|---|
| min | sec | hot (° C.) | cold (° C.) | ΔT (° C.) | $k_{eq}$ (W/m²K) |
| 20 | 1200 | 19.3 | 2.4 | 16.9 | 0.25 |
| 25 | 1500 | 19.2 | 2 | 17.2 | 0.24 |
| 30 | 1800 | 19.1 | 2 | 17.1 | 0.24 |
| 35 | 2100 | 19 | 1.9 | 17.1 | 0.24 |
| 40 | 2400 | 19 | 1.7 | 17.3 | 0.24 |
| 45 | 2700 | 18.9 | 1.5 | 17.4 | 0.24 |
| 50 | 3000 | 18.9 | 1.5 | 17.4 | 0.24 |
| 55 | 3300 | 18.8 | 1.4 | 17.4 | 0.24 |
| 60 | 3600 | 18.8 | 1.2 | 17.6 | 0.24 |

Figure 9:
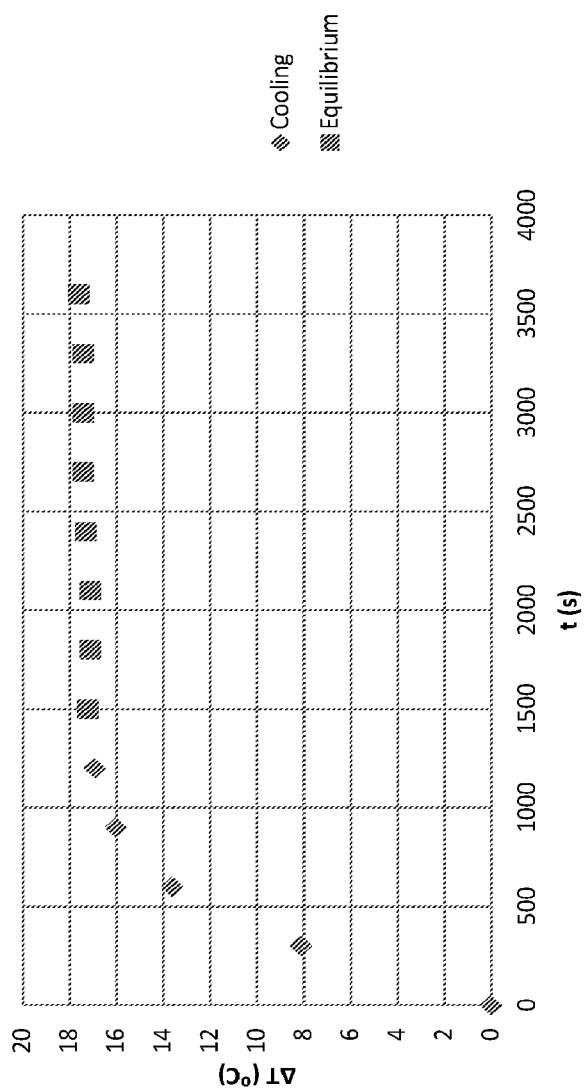
FIG. 9 is a graphical representation of the temperature difference measured over the course of the conductivity experiment with bioplastic compositions, according to an exemplary embodiment of the invention.

FIG. 9 is a graphical representation of the temperature difference measured over the course of the conductivity experiment, with the equilibrium points highlighted in red. Using the equilibrium points as the ΔT that this material would produce across a thickness of 1 cm with an input heat of 0.538 W to one side, with a cross-sectional area of 0.00129 m², the conductivity of this polymer was calculated to be 0.24

$$\frac{W}{m° C.}.$$

This is within the range of synthetic insulations used in industry, slightly above polystyrene at 0.13 and below epoxy at 0.35 and Nylon at 0.25, and approximately equal to cellulose at 0.23.

Properties of an Exemplary Biplastic Composition

Table 7 presents the engineering matrix used to determine the effectiveness of different polymers as insulators, and their viability for commercial production and deployment in the developing world. All scoring criteria were ranked, and then converted to scores out of an assigned minimum for each category.

The engineering matrix in Table 7 was used to determine comparative ratings of existing insulations (polystyrene, cellulose, and asbestos) and the produced polymer. Each category was given a relative weighting based on the importance of the criteria, and total scores and percentages were found to determine the overall ranking of each product.

Thermal resistivity was given the most weight with a possible score of 20 because any material being used as insulation must be able to effectively decrease the flow of heat. Values for each product were determined using the thermal conductivities of the listed materials. Polystyrene and the produced polymer were both given a substantially higher value than their thermal conductivities would suggest, because they both can be foamed, which (using polystyrene as a model) increases thermal resistivity by a factor of approximately 2.5.

An experiment was conducted to determine the thermal conductivity of the produced polymer. This test is described in Example 12. Using information about the conductivities of the other materials, values were determined using a scaled ranking. Embodiments of the bioplastic composition include compositions with thermal conductivity between 0.05 to 0.30 W/(m° C.). Certain embodiments include compositions with thermal conductivity between 0.05 to 0.25 W/(m° C.) or between 0.10 to 0.25 W/(m° C.). Thermal conductivity can be manipulated by physical means, such as changing thickness or density of the bioplastic compositions. Thermal conductivity can also be manipulated by chemical means by addition of suitable additives such as stone dust, glass, fiber glass, or other compounds.

Insulative efficiency of the test plastic was analyzed following a determination of their thermal conductivities as described in Example 6 and compared against the thermal conductivities of polystyrene (0.13), Amulum plastic (0.24), asbestos (0.26), and cellulose insulation (0.50) (highly variable). The roofing test yielded valuable information about the benefit of using bioplastic insulation with the corrugated metal roofing common in the developing world. The trend lines in FIGS. 5 and 6 represent the normal addition of heat after the initial external increase. The reason the first segment of data, labeled "before apex" on the graph, is so drastically curved is because both external and internal temperatures started equal, and the heat source caused the external temperature to increase much more rapidly. After the apex of temperature difference, the two temperatures had stabilized, and the only cause of change is diffusion across the boundary. Using the slopes of the trend lines for these measurements, it was determined that the insulation decreased heat transfer by a factor of 4.87. The significance of this is that a shelter with only the roof insulated with this plastic would cost 79.5% less to keep cool than a non-insulated building. With this reduction of cost, climate control in tropical regions could become economically feasible for the first time.

Ease of deployment was given a weighting of 10 because an effective insulation must be possible to build into a home or other structure. Values for this category were determined through a combined analysis of malleability, safety of exposure, weight and other mechanical properties, and resistance to damage. Polystyrene and Amulum plastics are both installed as sheets, while cellulose and asbestos sprayed. Polystyrene and Amulum can be produced in large scale quantities.

Flexibility was given a weight of 7, because non-rigidity is very important for traditional methods of wall and roof insulation that require them to be bent around corners or squeezed between studs without having its integrity compromised. Early batches of the potato bioplastic, which included only starch, plasticizer, and acid in the 10:4:4 ratio, were weak and flexible to the extent that some of them did not hold together when force was applied, even tearing under their own weight, thus indicating the need for additives in the composition to manipulate this mechanical property. Other batches, which included only starch, plasticizer, and acid in the 10:2:2 ratio, were completely inflexible and cracked before they bent at all, thus indicating the need for additives in the composition to increase flexibility and provide desired mechanical properties to this plastic. This wide range of properties of these bioplastic compositions make them useful for a variety of applications that require different levels of flexibility and rigidity. Rigidity and flexibility can be manipulated by physical means, such as foaming or spinning of the bioplastic into fibers. Rigidity and flexibility can also be manipulated by chemical means by addition of suitable additives such as stone dust, glass, fiber glass, or binders. Asbestos and Styrofoam are both completely inflexible, and cellulose was given a non-zero value here only because it can be cast into any shape during deployment.

Values for recyclability were assigned based on the ability of a material to be reprocessed through re-melting or other means. This rating was related to the rating for non-flammability because materials which burnt would not be capable of melting or being reprocessed. Each substance was ranked based on the ease of its being melted down and its response to an open flame. These rankings were then converted to points with a function. Recyclability was given a max score of 10 because it would decrease waste and add to the positive environmental impact of the polymer, and flammability was given a weight of 5 because, while it is an important quality for any building material to possess, insulation should never come into contact with open flames. Because polystyrene combusted easily and could not be melted down, it received the worst ratings in both categories. The pure starch plastic did not burn at all and was able to be completely melted down into a resin and recast, which resulted in its having the highest ratings. The plastics produced with ratios did better the more glycerin and acetic acid they were produced with; lower concentrations left pockets of unreacted starch which could combust. Polystyrene is non-recyclable, and so is asbestos, so they received a score of 0 in this category. Cellulose could be reused, but it would be a very difficult process. The produced polymer can be melted down and recast an indefinite number of times.

Moldability was given a weighting of 7 because nearly all small-scale commercial applications for plastic require the polymer to be cast into specific shapes. For insulative materials, this would mean being cast in the shape of thermoses, coolers, and other such products. To determine a rating for this category, the mechanical properties and production advantages and problems of each plastic were analyzed. The three ratio plastics were too thick, too weak, or too slow to dry to be molded in a timely manner. The pure starch method was a prime candidate, and was molded in two different forms (FIG. 3). Polystyrene copies perfectly and casts instantly; while Amulum copies perfectly but sets slower; cellulose can be sprayed, and asbestos cannot be cast. Using these observations, and information about the polystyrene and asbestos comparisons, a ranking was decided and converted to scores using a function.

Non-perishability was given a possible score of 7 points because in order for a material to be used as a building material it must have a long lifespan and be immune to decomposition and other degradation. To determine values, samples of different plastic were tested for susceptibility to decomposition in an ideal environment for microbes, and all samples were monitored for signs of degradation. Every single sample resisted any attempt to grow a fungus or mold on it for over one year, and none of the samples showed any sign of degradation, indicating that no decomposition was possibly starting. This is a very rare property for a bioplastic to have because most of them can be decomposed relatively easily, making the potato polymers somewhat unique. Their prolonged lifespan lends them to use as a long-term building material, such as insulation. It is beneficial for decomposition to be possible, however, so an experiment was conducted to determine whether this polymer could possible biodegrade. Within 21 days, the plastic was decomposed, indicating that it is completely compostable when wet. Building insulation should be dry any time that it is still in use, so this does not detract from it in any way as a building material. Polystyrene and asbestos do not decay, amulum does not decay when dry, and cellulose is a risk for microbial infestation.

Values for non-toxicity were determined based on the effect that releasing the polymer into an ecosystem would have. This was given a weighting of 5 because recyclability would negate some of the effect that landfill would have. As the potato bioplastics were produced from entirely organic chemicals, and because they can be de-solidified in water, their environmental effect would be negligible. There is nothing in any of these polymers which is remotely toxic, so they all received the full points. Amulum plastic is completely chemically inert, cellulose fibers are only a very minor risk, polystyrene is solidified petroleum and highly toxic, asbestos is a safety hazard. Polystyrene is very dangerous to the environment. It is highly toxic, can leech into water supplies, and would remain in an ecosystem indefinitely because there is no natural process which would dissipate it. Asbestos, as is widely known, is incredibly dangerous, and causes disease. In light of this, polystyrene and asbestos received 0 points for this category.

Values for adaptable sourcing were determined by comparing the number of different monomers which could be used to produce the plastic. If a polymer can be produced using several different monomer sources, it can be manufactured in numerous areas without requiring the importation of reactants. Because large-scale importation has become relatively cheap, this criterion was given a weighting of only 5 points. Polystyrene can only be produced from petroleum, so it received a score of zero. Asbestos, similarly, received a score of zero because it has to be mined. The cassava monomer test and the corn starch monomer test determined that the bioplastics could be produced from most starchy tubers. During production, the reactants underwent the same mechanical transformation as previous plastics, turning from opaque to translucent and thickening. The resulting substances were very flexible, easily torn, and most closely resembled the 10:4:4 potato paste ratio plastic. They were both smoother and cassava dried more easily while corn stayed damp for much longer, but that was expected because of their chemical contents. This test provided proof of concept that tropical starches and common agricultural products could be made to undergo the same reaction as potatoes, and it can be reasonably extrapolated that extracted cassava starch would yield a result analogous to the pure potato starch plastic. Nearly every environment has at least one starchy tuber, so these plastics could be produced in all of these areas using local resources. Because of this wide range of potential monomer sources, all of the bioplastic received full points in this category. Amulum can be produced with plants native to every inhabited region, cellulose can be derived from specific plants/products, but polystyrene and asbestos require very specific source materials.

Using these ratings and the engineering matrix in Table 7, overall rankings for the plastics were determined. The potato starch received the highest score, earning 87.35%, followed by polystyrene at 63.86%, cellulose at 59.04%, and finally asbestos at 36.75%.

An analysis of the cost per unit mass of the developed polymer was conducted. The bulk costs of the reactants were found to be: 0.3 per gram of pure, powdered starch, 3.5 per fluid ounce of pure glycerin, and 2.6 per fluid ounce of 5% acetic acid solution. Using a test batch of the bioplastic production process, it was determined that 50 grams of starch, when reacted with 6 fluid ounces each of 5% acetic acid solution and glycerin, yields approximately 300 grams of fully-reacted plastic. Using this observed quantity ratio and the cost of the reactants, it was determined that the materials necessary to produce 1 kg of this plastic would cost $1.77 USD. The solution needs to be heated in order to be reacted by this process, and a cost for heating this solution to the required temperature (100° C.) was determined to be approximately 3 per kilogram of plastic yield. This plastic, then, could be produced in its molten, unprocessed, fully-reacted form for a cost of $1.80 per kilogram.

An exact price for polystyrene, a common plastic used for insulative purposes, could not be found. The price of this plastic tends to fluctuate in price with the oil market, and is extremely volatile. On average, however, it was found that in recent years polystyrene has been produced for an estimated average of $2.30 per kilogram at low points for the market and $2.60 per kilogram at high points. The developed bioplastic, then, would be cheaper than currently-used, synthetic, environmentally harmful plastics.

Because different ratios of the starch molecules amylose and amylopectin could be used in producing this plastic, the final product could be manufactured to be incredibly rigid (with more amylopectin) or incredibly flexible (with more amylose), with mechanical properties being very easily controllable by using different ratios of monomers.

Table 7 presents the engineering matrix used to compare existing and produced polymers within the parameters of this study.

TABLE 7

Engineering Matrix

| Criteria | Max Score | Polystyrene Polymer Foam | Asbestos & Cement Board | Cellulose Fiber Fiber | Bioplastic Prototype Foam |
|---|---|---|---|---|---|
| Insulative Efficiency | 20 | 20.0 | 12.0 | 12.0 | 18.0 |
| Ease of Deployment | 10 | 7.0 | 0.5 | 5.0 | 7.0 |
| Cost-Effectiveness | 10 | 6.0 | 5.0 | 7.0 | 10.0 |
| Flexibility | 7 | 2.0 | 0.0 | 3.0 | 5.0 |
| Biodegradability | 7 | 0.0 | 0.0 | 5.0 | 7.0 |
| Non-Perishable | 7 | 7.0 | 7.0 | 4.0 | 6.0 |
| Moldability | 7 | 7.0 | 3.0 | 4.0 | 6.0 |
| Non-Toxicity | 5 | 2.0 | 0.0 | 4.0 | 5.0 |
| Adaptable Sourcing | 5 | 0.0 | 0.0 | 3.0 | 4.0 |
| Non-Flammability | 5 | 2.0 | 3.0 | 2.0 | 4.5 |
| Total | | 53.0 | 30.5 | 49.0 | 72.5 |
| Possible | | 83.0 | 83.0 | 83.0 | 83.0 |
| Percent | | 63.86 | 36.75 | 59.04 | 87.35 |
| Rank | | 2 | 4 | 3 | 1 |

The developed potato starch polymer was determined to be the most desirable material for use as insulation, using rankings of the new polymer, cellulose, polystyrene, and asbestos across categories representing quality of insulation, quality as a building material, and environmental impact.

Bioplastic polymer compositions were developed to be effective as an insulator in the developing and developed worlds. These bioplastic compositions performed superior to polystyrene, cellulose, and asbestos as an insulator and a building material. With a potential energy cost reduction of 79.5%, using this polymer for roof insulation with existing structures could make climate control viable for the first time in developing, tropical countries.

The ease of production and of obtaining the necessary materials suggests that the polymers could be produced in the countries where they are needed without the requirement of sophisticated or expensive technology. The low cost of potatoes and the other reactants gives this polymer the potential to be made in almost any economy. The adaptable monomer sourcing of the produced plastics suggests a potential for local production in nearly all climates without any imported materials, making it much more feasible for use in developing regions.

In addition to meeting the initial design objectives, the polymer also possesses properties for commercial and industrial applications in industrialized nations. The versatility and high thermal resistivity of the plastic make it desirable for consumer goods such as kitchenware and for construction. The product also has many qualities which are unique or rare in bioplastics, such as the ability to be recycled and resistance to decay. The simplicity of the production process for this new biomaterial, the very low cost of production ($1.80/kilogram), and the wide range of possible uses make this a very promising polymer for replacing synthetic plastics in many roles. Based on the data analysis, the pure starch plastic could serve as a replacement for petroleum-based polymers in many applications. It could also be deployed in the developing world to provide insulation to the growing housing sector there. The process developed herein for producing chemically pure, fully-reacted, thermally resistive polymers from starch molecules (and any glucose-based molecule) is a novel method of producing biopolymers with potential to serve as replacements for current synthetic plastics. One polymer produced by this process, derived from potato starch, could serve as a replacement for many modern forms of insulation, serving the same purpose for less cost and none of the environmental harm.

The thermal resistivity and other properties of these bioplastic compositions are ideal for their use as insulators. While the compositions may need to be foamed, in the same process with which polystyrene is manufactured into Styrofoam, this bioplastic shows potential to be an effective commercial and industrial insulation, with no negative environmental impact.

Other methods of production could be tried, as well as various industrial processing methods such as extrusion, gas injection, and rapid-production machine molding. This would allow for a larger variety of uses, and result in more petroleum-based plastics being replaced by a sustainable, environmentally-friendly one.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A method of making a bioplastic composition, the method comprising:
providing a first aqueous mixture containing at least one plasticizer and at least one acid, wherein the first aqueous mixture comprises water;
adding at least one starch to the first aqueous mixture to produce a second aqueous mixture; and
heating and mixing the second aqueous mixture to produce a precipitate, the precipitate comprising the bioplastic composition,
wherein the first aqueous mixture is not heated prior to adding the at least one starch, and wherein the bioplastic composition consists essentially of between 40 wt. % and 65 wt. % of the at least one plasticizer, between 2 wt. % and 25 wt. % of the at least one starch and between 1 wt. % to 10 wt. % of the at least one acid with the remainder being water.

2. The method of claim 1, wherein the bioplastic composition contains between 5 wt. % and 15 wt. % starch, 45 wt. % and 55 wt. % plasticizer, and 1 wt. % to 5 wt. % acid.

3. The method of claim 1, wherein the bioplastic composition comprises about 11.0 wt. % starch, about 49.4 wt. % glycerin, about 37.6 wt. % water, and about 2.0 wt. % acid.

4. The method of making the bioplastic composition of claim 1, wherein the at least one starch is selected from the group consisting of cassava starch, potato starch, tapioca starch, sweet potato starch, and combinations thereof.

5. The method of making the bioplastic composition of claim 1, wherein the at least one starch is a potato starch.

6. The method of making the bioplastic composition of claim 1, wherein the at least one plasticizer is glycerin.

7. The method of claim 1, wherein the at least one acid is selected from the group consisting of carboxylic acid, phosphoric acid, sulfonic acid, boric acid, and combinations thereof.

8. The method of claim 1, wherein the at least one acid is acetic acid.

9. The method of claim 1, further comprising the step of molding the precipitate into an appropriate shape for placement between the ceiling and the roof of the building.

* * * * *